US012761107B2

(12) United States Patent

Kasallis et al.

(10) Patent No.: US 12,761,107 B2

(45) Date of Patent: Oct. 13, 2026

(54) NON-INTRUSIVE VALVE ACTIVITY AND STATUS INDICATOR

(71) Applicant: Hansen Technologies LLC, Burr Ridge, IL (US)

(72) Inventors: James Kasallis, Lombard, IL (US); Bryant Crane, Western Springs, IL (US); Harold Streicher, Plainfield, IL (US)

(73) Assignee: HANSEN TECHNOLOGIES LLC, Burr Ridge, IL (US)

(*) Notice: Subject to any disclaimer, the term of this patent is extended or adjusted under 35 U.S.C. 154(b) by 199 days.

(21) Appl. No.: 18/602,443

(22) Filed: Mar. 12, 2024

(65) Prior Publication Data

US 2024/0310235 A1 Sep. 19, 2024

Related U.S. Application Data

(60) Provisional application No. 63/489,856, filed on Mar. 13, 2023.

(51) Int. Cl.
*G01M 3/28* (2006.01)

(52) U.S. Cl.
CPC ................................ *G01M 3/2876* (2013.01)

(58) Field of Classification Search
CPC ............ G01M 3/00; G01M 3/26; G01M 3/28; G01M 3/2876
See application file for complete search history.

(56) References Cited

U.S. PATENT DOCUMENTS

| | | | |
|---|---|---|---|
| 6,134,949 | A | 10/2000 | Leon et al. |
| 6,745,107 | B1 | 6/2004 | Miller |
| 6,820,465 | B2 | 11/2004 | Summers et al. |
| 7,765,817 | B2 | 8/2010 | Takegami et al. |
| RE42,006 | E | 12/2010 | Pham et al. |
| 7,869,971 | B2 | 1/2011 | Varga |

(Continued)

FOREIGN PATENT DOCUMENTS

| | | | | |
|---|---|---|---|---|
| EP | 2940447 | A1 | 11/2015 | |
| WO | WO-2011054198 | A1 * | 5/2011 | ............ G01M 3/184 |

(Continued)

OTHER PUBLICATIONS

Machine Translation of WO-2011054198-A1 (Year: 2011).*

(Continued)

*Primary Examiner* — Nguyen Q. Ha

(74) *Attorney, Agent, or Firm* — Troutman Pepper Locke LLP

(57) ABSTRACT

Systems and methods described herein provide for detection and monitoring a status of a piping system. A valve status detection system includes an activity detector configured to detect flow downstream of a valve in a pipeline of the piping system, and an analyzer assembly. The analyzer assembly stores one or more state detection logics corresponding to one or more use cases of the piping system and receives input to select a use case. The analyzer selects a state detection logic corresponding to the selected use case. The analyzer assembly identifies a flow reading based on a signal from the activity detector and determines a status of the piping system based on the flow reading and the selected state detection logic corresponding to the selected use case.

18 Claims, 11 Drawing Sheets

(56) References Cited

U.S. PATENT DOCUMENTS

| | | | |
|---|---|---|---|
| 7,950,266 B2 | 5/2011 | Kuhnle et al. | |
| 8,261,595 B2 | 9/2012 | Szepek et al. | |
| 8,947,242 B2 | 2/2015 | Kucera et al. | |
| 9,080,923 B2 | 7/2015 | Quatmann et al. | |
| 9,080,924 B2 | 7/2015 | Welker et al. | |
| 9,528,901 B2 | 12/2016 | Kiesbauer | |
| 9,546,604 B2 | 1/2017 | Clauson et al. | |
| 9,625,349 B2 | 4/2017 | Jensen et al. | |
| 9,969,379 B2 | 5/2018 | Nanahara et al. | |
| 10,048,160 B2 | 8/2018 | Gnoss et al. | |
| 10,156,153 B2 | 12/2018 | Reigl et al. | |
| 10,156,209 B2 | 12/2018 | Jackson et al. | |
| 10,533,916 B2 | 1/2020 | Sawachi et al. | |
| 10,690,081 B2 | 6/2020 | Henson et al. | |
| 11,236,919 B2 | 2/2022 | Zhai et al. | |
| 11,435,258 B2 | 9/2022 | Burke et al. | |
| 2003/0110838 A1 | 6/2003 | Summers et al. | |
| 2005/0126190 A1 | 6/2005 | Lifson et al. | |
| 2007/0289635 A1 | 12/2007 | Ghazarian et al. | |
| 2008/0034765 A1 | 2/2008 | Takegami et al. | |
| 2009/0024258 A1 | 1/2009 | Varga | |
| 2009/0056353 A1 | 3/2009 | Sunderland | |
| 2009/0120111 A1 | 5/2009 | Taras et al. | |
| 2009/0178463 A1 | 7/2009 | Kuhnle | |
| 2010/0174412 A1 | 7/2010 | Kwon et al. | |
| 2011/0100096 A1 | 5/2011 | Szepek et al. | |
| 2011/0307191 A1 | 12/2011 | Lafleur et al. | |
| 2012/0239315 A1 | 9/2012 | Baker et al. | |
| 2013/0154841 A1 | 6/2013 | Kucera et al. | |
| 2013/0180317 A1 | 7/2013 | Welker et al. | |
| 2013/0223494 A1 | 8/2013 | Jensen et al. | |
| 2014/0047902 A1 | 2/2014 | Kiesbauer | |
| 2014/0174158 A1 | 6/2014 | Quatmann et al. | |
| 2015/0142340 A1 | 5/2015 | Radomsky et al. | |
| 2016/0011072 A1* | 1/2016 | Hale | G01F 1/662 702/48 |
| 2016/0059839 A1 | 3/2016 | Nanahara et al. | |
| 2016/0069772 A1 | 3/2016 | Gnoss et al. | |
| 2016/0201572 A1 | 7/2016 | Clauson et al. | |
| 2016/0334029 A1 | 11/2016 | French | |
| 2017/0198831 A1 | 7/2017 | Beschorner et al. | |
| 2017/0218886 A1 | 8/2017 | Jackson et al. | |
| 2018/0058253 A1 | 3/2018 | Reigl et al. | |
| 2018/0180509 A1 | 6/2018 | Sawachi et al. | |
| 2018/0299342 A1 | 10/2018 | Hornung | |
| 2019/0170606 A1 | 6/2019 | Nakhjavani et al. | |
| 2019/0294183 A1 | 9/2019 | Al Khunaizi et al. | |
| 2019/0323445 A1 | 10/2019 | Henson et al. | |
| 2020/0063892 A1 | 2/2020 | Ke et al. | |
| 2020/0292407 A1 | 9/2020 | Matsumoto et al. | |
| 2021/0010705 A1 | 1/2021 | Zhai et al. | |
| 2021/0146907 A1 | 5/2021 | Ganzel et al. | |
| 2021/0199214 A1 | 7/2021 | Sorlie et al. | |
| 2021/0247263 A1 | 8/2021 | Burke et al. | |
| 2022/0065731 A1 | 3/2022 | Miyabe | |
| 2022/0230853 A1 | 7/2022 | Gu | |
| 2022/0274035 A1 | 9/2022 | Al-Sada | |
| 2022/0282885 A1 | 9/2022 | Zhuo et al. | |

FOREIGN PATENT DOCUMENTS

| | | |
|---|---|---|
| WO | 2014032812 A1 | 3/2014 |
| WO | 2015181609 A1 | 12/2015 |
| WO | 2016203273 A1 | 12/2016 |
| WO | 2017122479 A1 | 7/2017 |
| WO | 2017190630 A1 | 11/2017 |
| WO | 2022018584 A1 | 1/2022 |

OTHER PUBLICATIONS

International Search Report and Written Opinion issued in corresponding International Application No. PCT/US2024/019491, mailed on Aug. 29, 2024, 20 pages.

* cited by examiner

200

| Valve State (210) | Activity Detected (220) | Valve Status (230) |
|---|---|---|
| OPEN | YES | Good |
| CLOSED | NO | Good |
| OPEN | NO | Fail |
| CLOSED | YES | Fail |

400

| Valve State (410) | | Liquid Detector (420) | | Gas Detector (430) | | Alarm Condition (440) | |
|---|---|---|---|---|---|---|---|
| | | Flow | No Flow | Flow | No Flow | | |
| Refrigerant Feed Solenoid | Open | X | | X | | Safety | 452 |
| | Open | X | | | X | None | 454 |
| | Open | | X | X | | Safety, Uptime | 456 |
| | Open | | X | | X | Uptime | 458 |
| | Closed | X | | X | | Safety | 460 |
| | Closed | X | | | X | Efficiency | 462 |
| | Closed | | X | X | | None | 464 |
| | Closed | | X | | X | None | 466 |
| Refrigerant Feed Line Compliance Testing | Open + Shut Off Open | X | | | | None | 468 |
| | Open + Shut Off Open | | X | | | Compliance | 470 |
| | Open + Shut Off Closed | X | | | | Compliance | 472 |
| | Open + Shut Off Closed | | X | | | None | 474 |

FIG. 4

NON-INTRUSIVE VALVE ACTIVITY AND STATUS INDICATOR

CROSS-REFERENCE TO RELATED APPLICATION

This application claims priority under 35 U.S.C. § 119, based on U.S. Provisional Patent Application No. 63/489,856, filed Mar. 13, 2023, titled "Non-intrusive Valve Activity and Status Indicator," the disclosure of which is hereby incorporated by reference.

BACKGROUND OF THE INVENTION

Currently, the refrigeration industry uses potentially hazardous refrigerants like ammonia, carbon dioxide, and chlorofluorocarbons (CFCs), and may include secondary fluids such as brines, glycol, and water. Refrigeration systems may utilize many valves to control and direct the flow of refrigerants. These systems may include complex valve position sensors that significantly increase the cost and complexity of a refrigeration system and are, therefore, not desirable. There is currently no true non-intrusive way to quickly determine a valve state, such as if a valve is open/closed and performing the required function while also determining and preventing a next process step from occurring if it is not safe to proceed.

BRIEF DESCRIPTION OF THE DRAWINGS

FIG. 4 is an example state detection logic diagram that may be used in the piping system of FIG. 3;

DETAILED DESCRIPTION

Figures 1, 2:
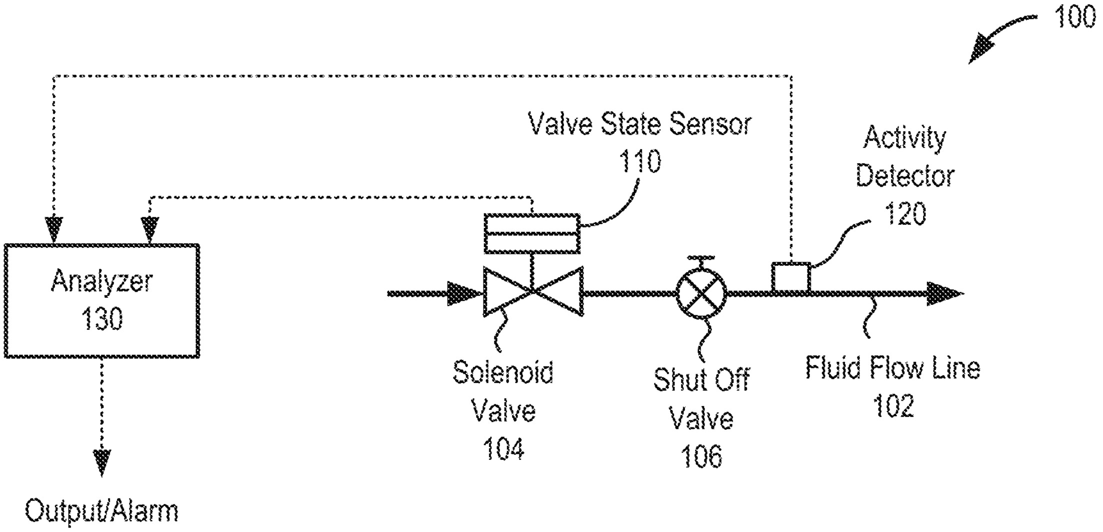
FIG. 1 is a diagram of a piping system illustrating concepts described herein.
FIG. 2 is an example state detection logic diagram that may be used in the piping system of FIG. 1.

The following detailed description refers to the accompanying drawings. The same reference numbers in different drawings identify the same or similar elements.

Non-intrusive detection of a valve state is an important function for a variety of use cases such as in refrigeration systems and other systems (e.g., industrial refrigeration systems, commercial refrigeration systems, non-refrigeration ammonia systems, etc.). Testing, monitoring, alarms, and fail-safe operations may all rely on detecting an "actual" valve status (e.g., open, closed, leaking) for a system using both gases and liquids. Furthermore, actual valve status information may be used to ensure efficient system operations. Current non-intrusive detection methods may rely on actuator signals or valve position indicators to identify a valve status. Such methods may be subject to error when, for example, a valve defect (e.g., stiction, leakage, blockage, etc.) is present. Intrusive detection methods (e.g., ultrasonic flow meters or other in-line devices) can be expensive and impractical in retrofit applications.

Systems and methods described herein use non-intrusive activity detectors (e.g., sensors) that can be attached to pipes and/or valves to measure and indicate if there is flow within the pipes. The activity detectors can be used with different mediums, such as gas, liquid, and gas/liquid mixture, in refrigerant pipes. In some implementations, sensing algorithms associated with the activity detectors may approximate flow amounts from the ambient noise. The systems and methods may combine the activity detectors with a solenoid state detection device. The solenoid state detection device (e.g., a solenoid coil sensor) may indicate whether the solenoid of a valve is energized. The combined inputs of activity detectors and the solenoid state detection device are used to confirm if a valve is functioning as intended for each pipe/service line.

According to an implementation, a valve detection system includes an activity detector configured to detect flow downstream of a solenoid valve in a pipeline of a piping system, and an analyzer assembly. The analyzer assembly stores state detection logic for one or more use cases of the piping system and receives input to select a use case. The analyzer assembly identifies a flow reading based on a signal from the activity detector and determines a status of the piping system based on the flow reading and the state detection logic for the selected use case.

According to another implementation, a method of valve monitoring is performed by an analyzer device. The method includes storing, in a memory, state detection logic for one or more use cases of a piping system; receiving user input to select a use case of the piping system; and receiving a valve state signal for a solenoid valve and a flow signal from an activity detector. The activity detector may be located downstream of the solenoid valve. The method further includes identifying a valve state, based on the signal from a valve state sensor; identifying a flow reading based on the flow signal from the activity detector; and determining a status of the piping system based on the valve state, the flow reading, and the state detection logic for the selected use case. The method may also include generating an alarm signal based on the determined status.

FIG. 1 illustrates concepts described herein. A system 100 includes a fluid flow line 102, or pipeline, with a solenoid valve 104 and a shut off valve 106. Fluid flow line 102 may include, for example, a liquid refrigerant feed line for a refrigeration system. In other implementations, fluid flow line 102 may transport different fluids (e.g., different liquids, gases, or mixed liquid and gas). A valve state sensor 110 may be integral with or attached to solenoid valve 104. An activity detector 120 (also referred to as a flow detector) may be attached to the fluid flow line 102 downstream of the shut off valve 106. An analyzer 130 may be communicatively coupled to valve state sensor 110 and activity detector 120.

Valve state sensor 110 may provide solenoid valve 104 state feedback to analyzer 130. For example, in one implementation, valve state sensor 110 may include a solenoid coil sensor to detect whether the solenoid valve 104 is energized (e.g., corresponding to an open position) or de-energized (e.g., corresponding to a closed position) and report the state to analyzer 130. In another example, valve state sensor 110 may detect movement from a position change of solenoid valve 104, such as a change from an open state to a closed state or from a closed state to an open state.

In other implementations, valve state sensor 110 may use a voltage/current sensing circuit for a valve actuator or another type of sensor to indicate a motorized valve's intended position.

Activity detector 120 may provide to analyzer 130 non-intrusive sensor readings for fluid flow line 102 downstream of solenoid valve 104. For example, activity detector 120 may be configured to attach to an external surface of fluid flow line 102 in a non-intrusive manner. According to different embodiments, activity detector 120 may be strapped, clamped, or bonded to a pipe of fluid flow line 102. In other embodiments, activity detector 120 may be strapped, clamped, screwed, or bonded to a valve of fluid flow line 102. In one implementation, activity detector 120 may include, for example, an acoustic sensor that may be attached to a pipe or valve to detect ambient noise levels. In one implementation, activity detector 120 may include, for example, an acceleration sensor (e.g., accelerometer) that may be attached to a pipe or valve to detect changes in movement/acceleration/deceleration to detect fluid flow. As an acceleration sensor, activity detector 120 may also prove useful in the detection of hydraulic shock events. In another implementation, activity detector 120 may include an ultrasonic sensor. Activity detector 120 may detect sounds indicating possible fluid flow (or the absence thereof) through a valve or pipe and provide the flow indication signals to analyzer 130. Although described herein primarily in the context of acoustic flow detection, in other implementations, activity detector 120 may provide sensor reading for other conditions that may be directly or indirectly tied to flow (e.g., temperature, condensation, vibration, etc.).

Analyzer 130 may include a computing device that is communicatively coupled to valve state sensor 110 and activity detector 120. Analyzer 130 may receive valve state information (e.g., energized/de-energized, open/closed) from valve state sensor 110 and flow indication signals from activity detector 120. The analyzer 130 may evaluate these inputs in combination to determine, for example, if solenoid valve 104 is functioning as intended for fluid flow line 102. As a simple example, if signals from valve state sensor 110 are consistent with flow indications from activity detector 120 (e.g., energized coil and flow detected), analyzer 130 may determine proper valve function. Alternatively, if signals from valve state sensor 110 are not consistent with flow indications from activity detector 120 (e.g., de-energized coil but flow detected), analyzer 130 may determine a valve failure.

FIG. 2 provides an example state detection logic diagram 200 for the simplified example of FIG. 1. Field 210 may correspond to signals received from valve state sensor 110. For example, valve state sensor 110 may generate signals to indicate that a solenoid valve is energized (Open/Closed) or de-energized (Closed/Open). In other implementations, valve state sensor 110 may provide other signals to indicate the intended valve state (e.g., actuator activity, valve position sensor, etc.). Field 220 may correspond to signals received from activity detector 120. For example, activity detector 120 may provide signals to indicate that flow is detected ("Yes") or not detected ("No"). Field 230 may correspond to a valve status based on the combination of entries in fields 210 and 220. For example, an energized coil ("Open") and detected flow ("Yes") would be consistent with a properly operating open solenoid valve 104 (e.g., valve status of "Good" in field 230). A de-energized coil ("Closed") and no detected flow ("No") would be consistent with a properly operating closed solenoid valve 104. An energized coil ("Open") and no detected flow ("No") would indicate a potential opening failure of solenoid valve 104 (e.g., valve status of "Fail" in field 230). A de-energized coil ("Closed") and detected flow ("Yes") would indicate a potential closing failure or leakage of solenoid valve 104.

As described further herein, combined solenoid state and flow detection readings for each of multiple valves in a system (e.g., an industrial refrigeration system) may be used for accurate system controls and monitoring. In some implementations, combined solenoid state and flow detection readings for multiple valves/service lines may be managed by a single analyzer 130. In other implementations, readings from individual analyzers 130 in different service lines may be provided to a collector, as described further below. In still other implementations, one or multiple analyzers 130 may provide valve status determinations to a control system, such as a programmable logic controller (PLC), that may manage the larger system.

According to an implementation, analyzer 130, activity detector 120, and/or valve state sensor 110 may be configured to support multiple use cases. For example, in systems with multiple service lines, an analyzer 130 and activity detector 120 may be used to detect different types of flows (e.g., gas flows, liquid flows, mixed gas/liquid flows) for different service lines (e.g., different fluid flow lines 102). Particularly, each activity detector 120 may be configured to detect activity (e.g., sound from flowing liquid, gas, or mixed flows detected through a pipe wall of fluid flow line 102; vibration that may be induced by flow; temperature changes on a pipe/valve surface; infrared detection of flow; etc.). Different use cases may relate to the type of flow, type of activity, and/or type of service line being monitored. In one implementation, activity detector 120 may be configured to operate at a wide range of temperatures (e.g., −30 degrees C. to 60 degrees C.) and for different pipe materials. Analyzer 130 may be configured to process the different readings from activity detectors 120 (e.g., different signals for liquid, gas, or mixed) with different signal processing techniques and different thresholds based on, for example, uses cases selected by a user. For example, a use case for analyzer 130 may be associated with a certain activity detector 120 when the activity detector is installed in a particular location/service line.

Figure 3:
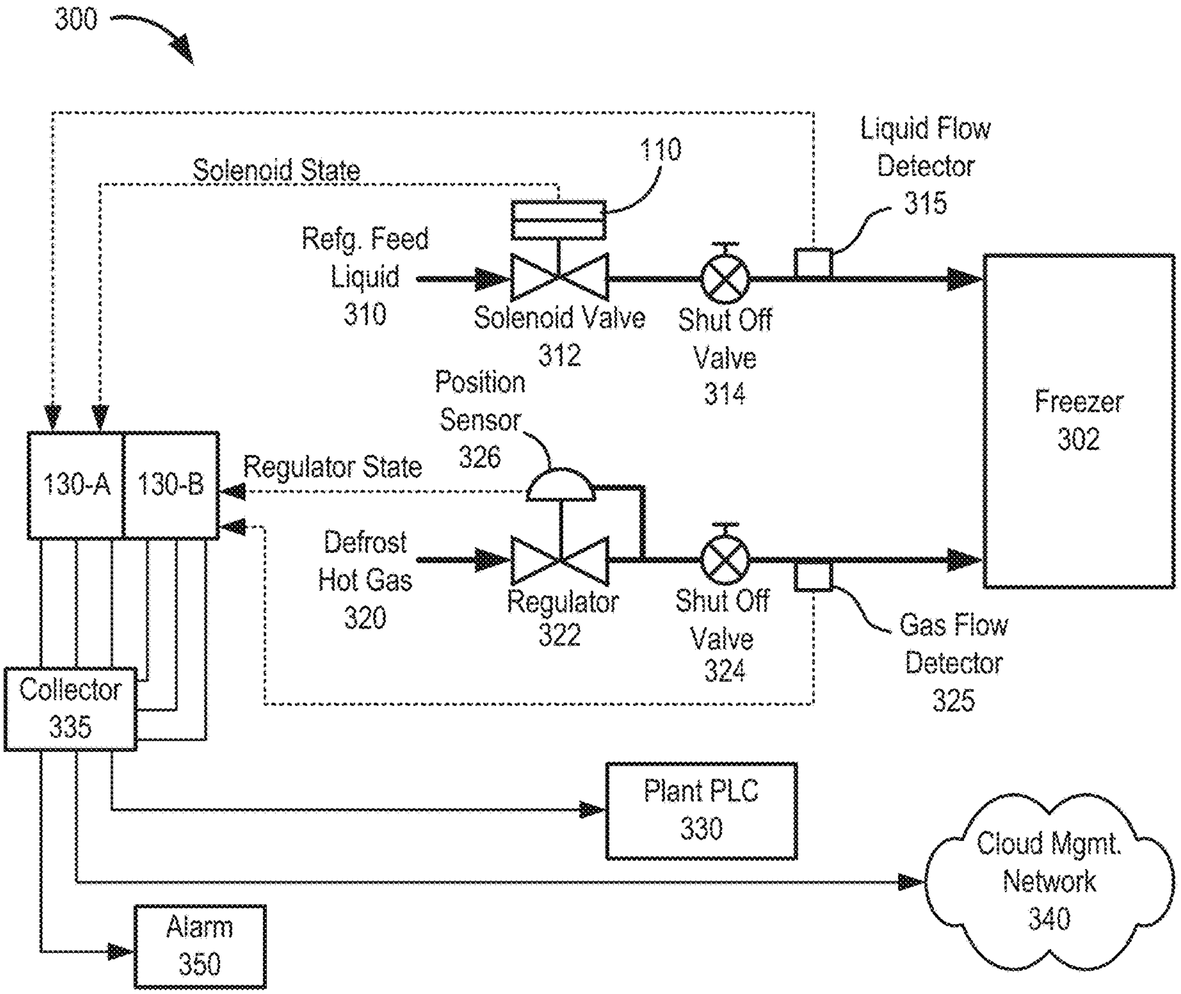
FIG. 3 is a diagram of another piping system illustrating concepts described herein.

FIG. 3 illustrates a refrigeration system 300 with multiple service lines, according to another implementation. Refrigeration system 300 may include a freezer 302 with a liquid refrigerant feed line 310 and a defrost gas feed line 320 monitored by analyzer 130. Refrigerant feed line 310 and defrost gas feed line 320 may correspond to variations of fluid flow line 102. Liquid refrigerant feed line 310 may have a solenoid valve 312 with valve state sensor 110 and a shut off valve 314. The defrost gas feed line 320 may have a regulator valve 322 with or without a position sensor 326 (which may correspond to another of valve state sensor 110) and a shut off valve 324. A liquid flow detector 315 (corresponding to an activity detector 120 described above) is attached to liquid refrigerant feed line 310 downstream of shut off valve 314. Similarly, a gas flow detector 325 (corresponding to another activity detector 120) is attached to defrost gas feed line 320 downstream of shut off valve 324. While liquid flow detector 315 and gas flow detector 325 are shown downstream of their respective shut off valves 314/324 in FIG. 3, in other implementations, activity detectors 120 such as liquid flow detector 315 and gas flow detector 325 may be in other locations. For example, liquid flow detector 315 may be located between solenoid valve 312 and shut off valve 314, and gas flow detector 325 may be located between regulator 322 and shut off valve 324.

In system 300, one or more analyzer 130 may be communicatively coupled to valve state sensor 110, position sensor 326, liquid flow detector 315, and gas flow detector 325. In the configuration shown in FIG. 3, separate analyzers 130-A and 130-B may be used for each service line (e.g., analyzer 130-A for valve state sensor 110 and liquid flow detector 315, and analyzer 130-B for position sensor 326 and gas flow detector 325). In another implementation, a single analyzer 130 may be used for multiple service lines. In the configuration of FIG. 3, analyzer 130-A may receive valve state information (e.g., open, closed) for solenoid valve 312 and liquid flow indications from liquid flow detector 315. Similarly, analyzer 130-B may receive valve state information for regulator 322 and gas flow indications from gas flow detector 325.

Each analyzer 130-A/130-B (referred to herein collectively as analyzer 130) or collector 335 may also be communicatively coupled to a centralized controller, such as a plant programmable logic controller (PLC) 330, a cloud management network 340 (e.g., a multi-plant cloud network or an intra-plant network), and/or an alarm system 350. Analyzer 130 may be configured to provide different status indicators/alarms to any of PLC 330, cloud management network 340, and alarm system 350 based on detected inputs from valve state sensor 110, position sensor 326, liquid flow detector 315, and gas flow detector 325. In some implementations, an optional intermediate collector 335 may be used to compile and forward signals from multiple analyzers 130.

FIG. 4 provides an example state detection logic diagram 400 for the simplified configuration of FIG. 3. In table 400, field 410 may correspond to configuration states for system 300, including operational states and compliance testing modes. For example, in field 410 signals from valve state sensor 110 may indicate if solenoid valve 312 is in an energized state ("Open") or de-energized state ("Closed"). Field 420 may correspond to signals received from liquid flow detector 315. For example, liquid flow detector 315 may include signals to show that flow in liquid refrigerant feed line 310 is detected ("Flow") or not detected ("No Flow"). Field 430 may correspond to signals received from gas flow detector 325. For example, gas flow detector 325 may include signals to show that flow in defrost gas feed line 320 is detected ("Flow") or not detected ("No Flow").

Field 440 may correspond to alarm conditions that correspond to the combinations of input signals from liquid flow detector 315 (in field 420) and gas flow detector 325 (in field 430) for different valve states (e.g., indicated by valve state sensor 110 and position sensor 326). Alarm conditions may include, for example, safety, uptime, efficiency, and compliance. Safety alarms may indicate a potential for catastrophic hydraulic shock due to incorrect sequencing or liquid and gas valve leaks. Uptime alarms may prompt for identification of defective valves. Efficiency alarms may identify potential energy waste due to, for example, excess hot defrost gas. Compliance alarms may indicate when the physical ability to open and close shut off valves is not confirmed (e.g., no flow is detected when shut off valve 314 or 324 is in an "open" state; or leakage/flow is detected when shut off valve 314 or 324 is in a "closed").

A variety of entries 452-474 may correspond to conditions for different alarm conditions in field 440. For example, in entry 452 of table 400, an energized coil ("Open") for solenoid valve 312 with detected flow in liquid flow detector 315 and gas flow detector 325 would indicate a safety alarm condition corresponding to a possibly unsafe condition. As another example, in entry 462, a de-energized coil ("Closed") for solenoid valve 312 with detected flow in liquid flow detector 315 and no detected flow in gas flow detector 325 would indicate an efficiency alarm condition. In still another example, in entry 472, an energized coil ("Open") for solenoid valve 312 and a closed shut off valve with detected flow in liquid flow detector 315 would indicate a compliance alarm condition. While table 400 illustrates multiple signal conditions for different alarm states in entries 452-474, in other implementations, analyzer 130 may apply different logic or additional logic for alarm conditions.

Figure 9:
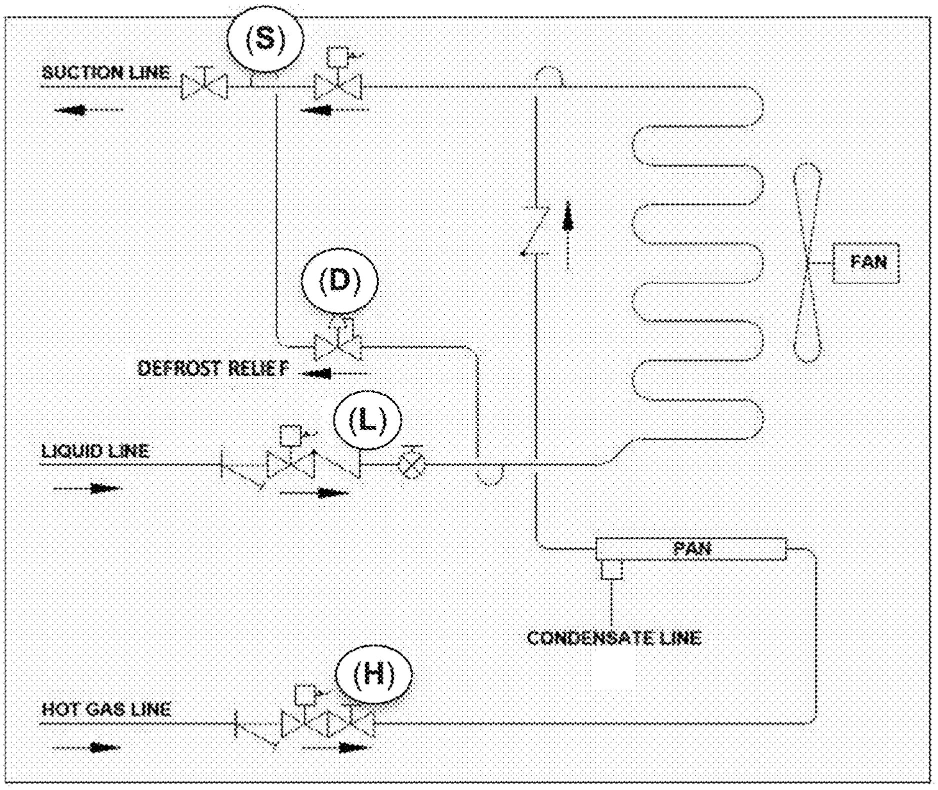
FIGS. 9-14 are diagrams illustrating example use cases of the systems and methods described herein.
Figure 10:
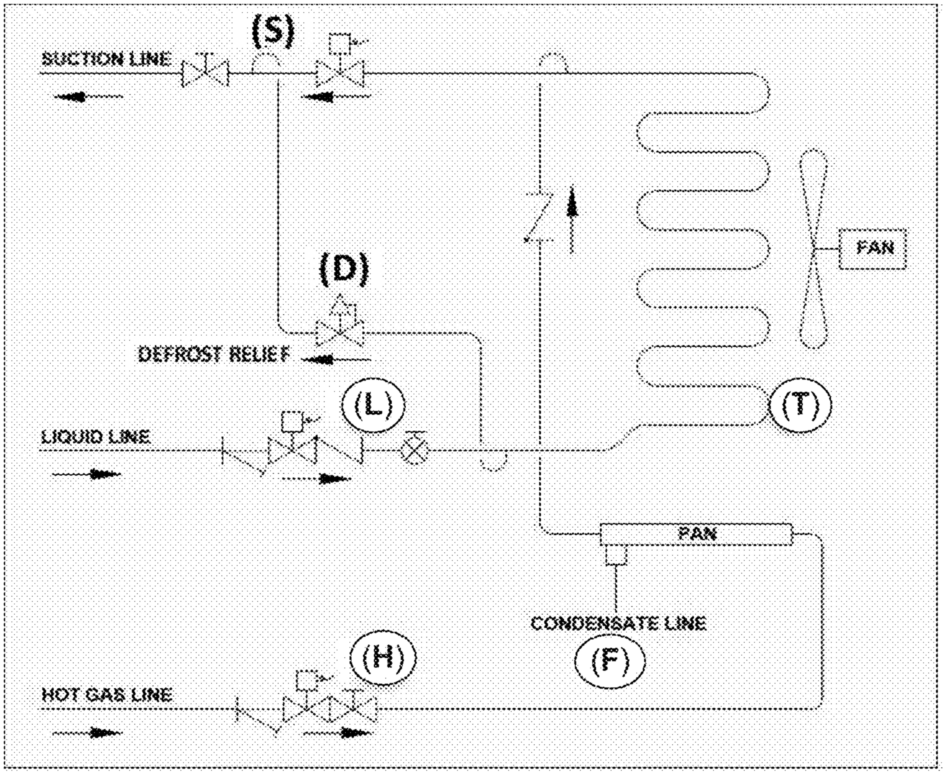

Although FIGS. 1-4 show a valve monitoring system using combined information from two types of sources (e.g., valve state sensor 110 and activity detector 120) for each pipeline, in other implementations, analyzer 130 may be configured to receive and interpret input from other sources. For example, in one implementation, analyzer 130 may receive additional input signals from an accelerometer (e.g., located at a suction line, as shown in FIG. 9) to help identify a hydraulic shock event, such as may occur when hot gas and liquid refrigerant flow at the same time. In another implementation, analyzer 130 may receive additional input signals from a temperature sensor (e.g., located on evaporator coils, as shown in FIG. 10) to help identify system inefficiency.

Figure 5:
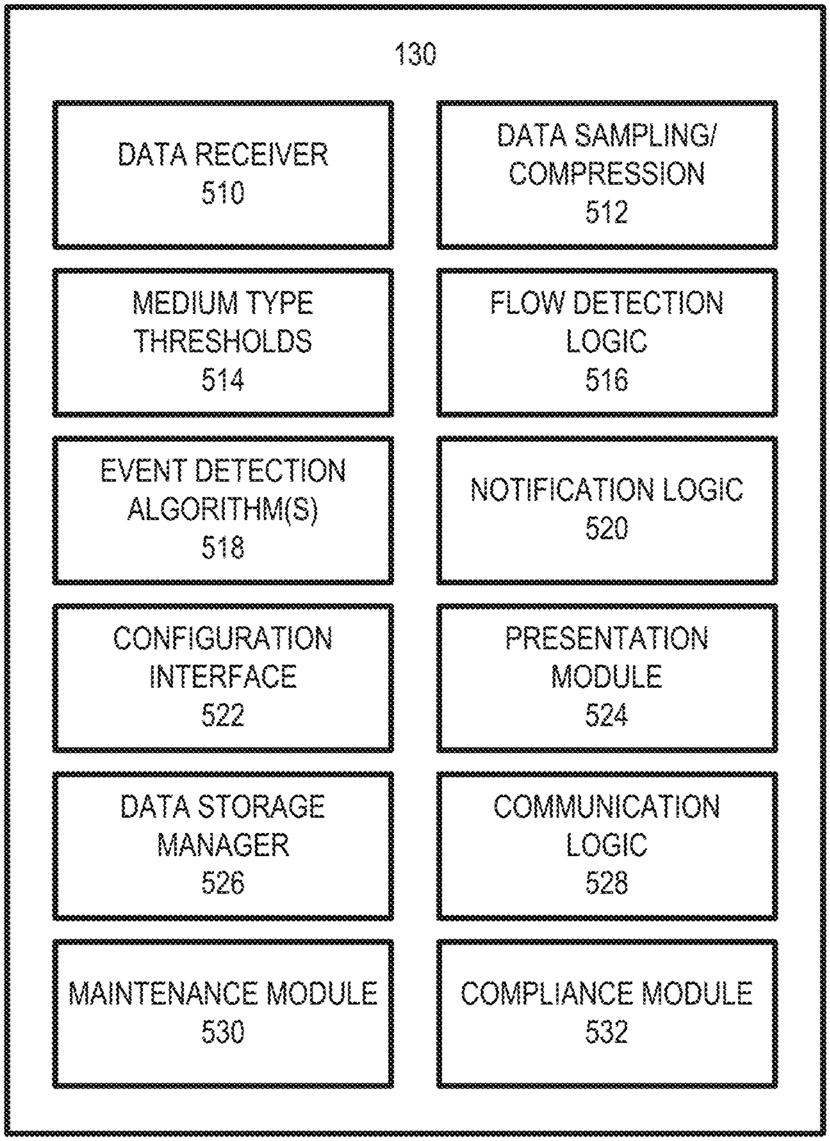
FIG. 5 is a block diagram illustrating example logical components of an analyzer device according to an implementation.

FIG. 5 is a block diagram illustrating example logical components of analyzer 130. The functions described in connection with FIG. 5 may be performed by one or more components of analyzer 130, as described, for example, in FIG. 8. Some or all of the logical blocks of FIG. 5 may be included, for example, in an application, stored in memory (e.g., memory 835) and executed by processor 820. Other logical blocks of FIG. 5 may be included as a hardware component (e.g., processor 820).

As shown in FIG. 5, analyzer 130 may include a data receiver 510, data sampling/compression logic 512, medium type thresholds 514, flow detection logic 516, event detection algorithms 518, notification logic 520, a configuration interface 522, a presentation module 524, a data storage manager 526, communications logic 528, a maintenance module 530, and a compliance module 532. Other configurations may be implemented. Therefore, analyzer 130 may include additional, fewer and/or different logical components than those depicted in FIG. 5.

Data receiver 510 may receive data from at least one solenoid valve and at least one corresponding activity detector. In one implementation, data receiver 510 may receive solenoid state data (e.g., energized or de-energized) via a direct link with valve state sensor 110. Data receiver 510 may also receive acoustic (sound) data or other data from activity detector 120 via a direct link at a native or other resolution. Data receiver 510 may include, for example, one or more ports for direct wired connections to valve state sensor 110 and/or activity detector 120. In other implementations, data receiver 510 may include a wireless interface to support communications with valve state sensor 110 and/or activity detector 120 via a wireless personal area network (WPAN), wireless local area network (LAN) or near-field communications (NFC). Additionally, in some implementations, data receiver 510 may include input ports to receive auxiliary sensor inputs, such as temperature, moisture (e.g., condensation), vibration, acceleration (e.g., shock), and/or supplemental valve state (e.g., valve motor) data.

Data sampling/compression logic 512 may apply data compression and/or conversion techniques to convert input data from flow sensor 120 (e.g., provided at a native resolution) to a resolution that is consistent with thresholds for different medium thresholds 514 and/or state detection logic (e.g., state detection logic diagram 200, state detection logic diagram 400, etc.). For example, data sampling/compression logic 512 may be configured to select every nth data sample from native resolution time-series data.

In one implementation, medium type thresholds 514 may store different monitoring thresholds for detecting flow of different mediums, such as gas, liquid, or gas/liquid mixtures in a pipe or valve. Medium type thresholds 514 may include, for example, different monitoring thresholds for each different type of fluid flow and/or sensor type. As an example, the threshold sound level to identify a gas flow through a pipeline may be lower than the threshold sound level to detect liquid. Thresholds may include, for example, acoustic thresholds, vibration thresholds, ultrasonic thresholds, or other levels that may be compared against filtered data from activity detectors 120. According to one implementation, medium type thresholds 514 may be configured based on baseline ambient conditions. For example, baseline conditions may be tested after an initial installation of valve monitoring equipment (e.g., activity detector 120, analyzer 130, etc.) and monitoring thresholds may be determined as medium-specific values above the baseline. In another implementation, medium type thresholds 514 may store baseline thresholds that indicate flow/no-flow conditions for a particular service line without regard to medium type. In another implementation, medium type thresholds 514 may store updated thresholds learned via a configuration routine or repeated iterations.

Flow detection logic 516 may apply the appropriate threshold type (e.g., gas, liquid, mixed, etc.) from medium type thresholds 514 to filtered data received from data sampling/compression logic 512 to determine whether there is flow in the monitored valve/pipe (e.g., downstream of a solenoid vale 104). For example, based on installed configuration information (e.g., provided via configuration interface 522), flow detection logic 516 may apply an acoustic or vibration threshold for liquids to signals received from liquid flow detector 315 to determine if there is flow in pipeline 310 past liquid flow detector 315.

In another implementation, flow detection logic 516 may include a learning feature to detect, interpret, or adjust thresholds. For example, flow detection logic 516 may identify changing conditions over time, such as decreased acoustic or vibration levels when flow is detected. Increased or decreased signal levels may be used to estimate/evaluate performance trends in a service line. Accordingly, thresholds may be appropriately scaled to indicate proportional strength of a signal for various related purposes, such as flow degradation monitoring or system load balancing.

Event detection algorithms 518 may include definitions and responses for events related to a particular pipeline or piping system (e.g., the particular combination of solenoid coil sensor(s), activity detector(s), and/or auxiliary sensors providing data to analyzer 130). Event detection algorithms 518 may include state detection logic, such as that illustrated in state detection logic diagram 400. In other implementations, event detection algorithms 518 may include thresholds, hysteresis settings, or other values that may be used to indicate a local valve event or abnormality. According to one implementation, event detection algorithms 518 may include alarm states and responses. For example, in some configurations, event detection algorithms 518 may include an interlock response (e.g., send interlock instructions to another valve) to ensure, for example, that hot gas (e.g., in line 320) and refrigerant (in line 310) are not flowing to freezer 302 at the same time.

Notification logic 520 may include instructions to inform one or more external devices/systems, such as PLC 330, cloud management network 340, or alarm system 350, of events, such as events detected by event detection algorithms 518 and/or maintenance module 530.

Configuration interface 522 may solicit and/or receive settings for analyzer to interpret signals from valve state sensor 110, activity detector 120, liquid flow detector 315, and/or gas flow detector 325. For example, configuration interface 522 may allow for input to associate an activity detector 120 with particular medium type thresholds (e.g., acoustic or vibration thresholds for one of liquid, gas, or mixed fluid flow). Additionally, or alternatively, configuration interface 522 may receive user input to indicate a particular mode (e.g., an operating mode or compliance test mode).

Presentation module 524 may include an indicator or display to indicate a local valve state (e.g., as determined by event detection algorithms 518). For example, presentation module 524 may include one or more light emitting diodes (LEDs) to indicate: whether a local solenoid valve 104 is energized ("open") or de-energized ("closed"), a local error state, an interlock status, etc. For example, color coded LEDs may be integrated with labels to indicate a status or alarm. In another implementation, a display screen may be used to provide a local valve state.

Data storage manager 526 may manage data storage for a memory (e.g., memory 835, FIG. 8) of analyzer 130. In one implementation, data storage manager 526 may manage a circular buffer for data received from activity detectors 120 and or valve state sensors 110. For example, data storage manager 520 may store time-series data from activity detectors 120 at a native resolution and overwrite oldest data when a memory capacity is reached for life cycle or performance history.

Communications logic 528 permits analyzer 130 to communicate with other devices, networks, systems, and the like. According to implementations described herein, communication logic 528 includes multiple wired and wireless interfaces (e.g., in communications module 830 described below). For example, communication logic 528 may include multiple transmitters and receivers, or transceivers. Communication logic 528 may operate according to one or more communication standards, such as standards to support cellular wireless standards, local wireless standards, Ethernet standards, USB interfaces, etc.

Maintenance module 530 may include definitions for life-cycle indicators related to a particular valve, pipeline, or piping system. For example, maintenance module 530 may store (e.g., in memory 835) valve health data indicators, valve cycling thresholds, maintenance schedules, and other information that may be required to indicate when testing or maintenance actions should be performed. Maintenance module 530 may monitor the life-cycle indicators against received valve state data. Maintenance module 530 may, for example, collect/log valve state information (e.g., from data receiver 510) to track against the life-cycle indicators. Maintenance module 530 may initiate a signal (e.g., via notification logic 520) to indicate when a testing or maintenance action is due, based on the life-cycle indicators. In one implementation, maintenance module 530 may be incorporated within event detection algorithms 518.

Compliance module 532 may include definitions for compliance test indicators related to a particular valve, pipeline, or piping system. For example, compliance module 532 may store (e.g., in memory 835) certain valve state and/of flow combinations for different regulations, safety standards, etc. Compliance module 532 may monitor the compliance test indicators against received valve state data. Compliance module 532 may, for example, collect/log valve state information (e.g., from data receiver 510) to track against the compliance test indicators. Compliance module 532 may initiate a signal (e.g., via notification logic 520) to indicate, for example, a compliance test result.

Although FIG. 5 shows exemplary logical components of analyzer 130, in other implementations, analyzer 130 may include fewer logical components, different logical components, or additional logical components than depicted in FIG. 5. For example, in another implementation, one or more logical function of analyzer 130 may be performed by activity detector 120 or PLC 330. Additionally or alternatively, one or more logical components of analyzer 130 may perform functions described as being performed by one or more other logical components.

Figure 6:
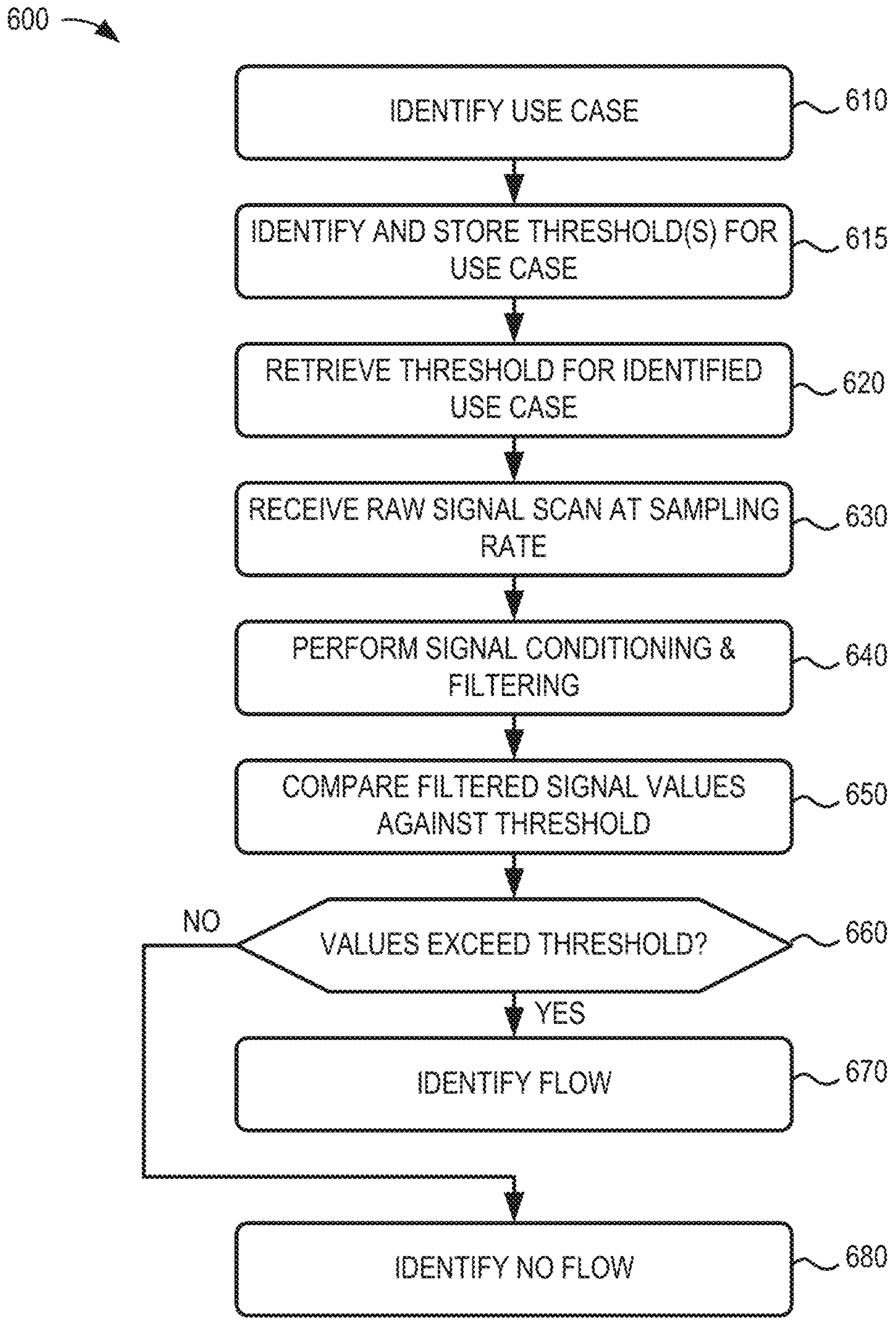
FIG. 6 is a flow diagram of an example process for detecting flow in a piping system.

FIG. 6 is a flow diagram for a process 600 for detecting flow in a piping system. In one implementation, process 600 may be performed, for example, by analyzer 130. In another implementation, process 600 may be performed by analyzer 130 in conjunction with one or more activity detectors 120.

Process 600 may include identifying a sensor use case (block 610), identifying and storing threshold for the use case (block 615), and retrieving thresholds corresponding to the sensor use case (block 620). For example, a flow sensor 120 may be installed in a piping line or valve and connected through a wired or wireless connection to analyzer 130. Depending on the installed location of flow sensor 120 (e.g., on refrigerant feed line 310, defrost gas line 320, or another pipeline), the flow sensor 120 may serve to detect liquid, gas, or mixed flows (e.g., as liquid flow detector 315, gas flow detector 325, etc.). When a particular flow sensor 120 is attached to a pipeline and communicatively coupled (e.g., wired or wireless) to analyzer 130, a user may configure analyzer 130 to associate the flow sensor 120 with a type of threshold (e.g., acoustic thresholds, vibration thresholds, etc.) for determining the absence or presence of one of liquid, gas, or mixed flows. In one implementation, analyzer 130 may perform a configuration routine to learn and store baseline thresholds that are indicative of detected flow for a given service line. Analyzer 130 may retrieve the stored thresholds to perform monitoring or testing.

Process 600 may further include receiving a raw signal scan at a sampling rate (block 630), performing signal conditioning and filtering (block 640), and comparing the filtered signal value against the threshold (block 650). For example, analyzer 130 may receive native resolution data from a flow sensor 120. Analyzer 130 may perform signal conditioning and filtering based on expected values for the selected use case/measured medium. For example, signal filtering for signals in a gas-bearing line may be different than signal filtering for signals in a liquid-bearing line. Once a processed (e.g., filtered/conditioned) signal is obtained, analyzer 130 may compare the filtered signal from flow sensor 120 with the thresholds for the assigned medium type. For example, assuming a particular flow sensor 120 is associated with a gas line, analyzer 130 may compare the filtered signals with monitoring thresholds (e.g., acoustic or vibration thresholds stored in medium type thresholds 514) for detecting gas flow. Assuming another particular flow sensor 120 is associated with a liquid line, analyzer 130 may compare those filtered signals with thresholds for detecting liquid flow.

If the filtered signal values exceed the threshold (block 660—Yes), process 600 may include identifying a flow at the flow sensor 120 (block 670). For example, analyzer 130 may detect flow based on a threshold comparison. As described further in connection with FIG. 7, analyzer 130 may apply the flow result to the appropriate state detection logic (e.g., state detection logic diagram 200, state detection logic diagram 400, etc.). In another implementation, analyzer 130 may identify changing conditions of detected flows over time, such as consistently higher or lower vibration levels when flow is detected, which may be indicative of clogs, wear, or the like.

If the filtered signal values do not exceed the threshold (block 660—No), process 600 may include identifying no flow at the flow sensor 120 (block 680). For example, analyzer 130 may detect no flow based on a threshold comparison. As described further in connection with FIG. 7, analyzer 130 may apply the no flow result to the appropriate state detection logic (e.g., state detection logic diagram 200, state detection logic diagram 400, etc.).

Figure 7:
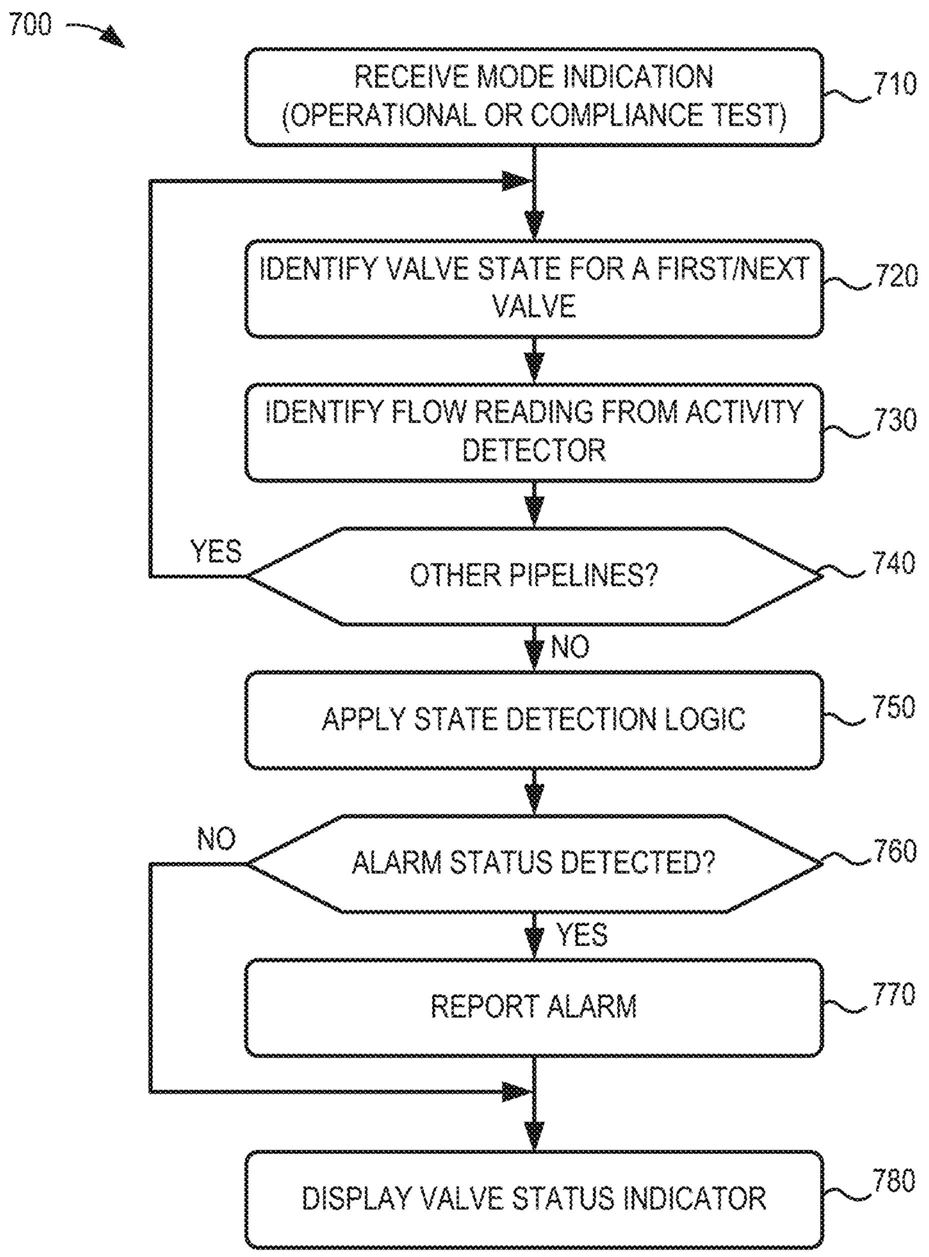
FIG. 7 is a flow diagram of an example process for monitoring a piping system.

FIG. 7 is a flow diagram for a process 700 for monitoring a piping system. In one implementation, process 700 may be performed, for example, by analyzer 130. In another implementation, process 700 may be performed by multiple analyzers 130 in conjunction with a centralized unit, such as collector 335 or plant PLC 330.

Process 700 may include receiving a mode indication (block 710) and identifying a valve state (block 720). For example, analyzer 130 may be prompted (e.g., by a user interface command associated with configuration interface 522 or a signal from PLC 330) to apply logic for one of multiple modes, such as an operational monitoring mode or a compliance testing mode. In the selected mode, analyzer 130 may receive signals from a connected solenoid valve (e.g., solenoid valve 312 or activity detector 110). The signals from the solenoid valve may indicate an energized ("open") or de-energized ("closed") state.

Process 700 may further include identifying a flow reading from a first activity detector (block 730). For example, in the selected mode, analyzer 130 may receive signals from a connected activity detector 120 associated with the solenoid valve. Analyzer 130 may apply, for example, steps of process 600 to identify a flow reading from the activity detector 120 associated with analyzer 130.

Process 700 may further include determining if there are other relevant pipelines (block 740). For example, analyzer 130 may determine if other feed lines are relevant to the mode/logic selected for analyzer 130. If there are other relevant pipelines (block 740—Yes), process 700 may return to process block 720 to collect valve state and flow readings for an additional pipeline (e.g., line 320).

If there are no other relevant pipelines (block 740—No), process 700 may include applying state detection logic (block 750) and determining if there is an alarm state (block 760). For example, analyzer 130 may apply the valve state(s) and flow reading(s) to the state detection logic (e.g., corresponding to state detection logic diagram 200, state detection logic diagram 400, etc.) to determine a status, test result, alarm state, etc., associated with the current mode.

If an alarm status is detected (block 760—Yes), analyzer 130 may report an alarm (block 770). For example, if the state detection logic indicates an alarm state (e.g., safety alarm, uptime alarm, efficiency alarm, compliance alarm, etc.), analyzer 130 may report the alarm to a centralized unit, such as plant PLC 330 or cloud management network 340.

If an alarm status is not detected (block 760—Yes) or in conjunction with reporting an alarm, process 700 may include displaying a valve status indicator (block 780). For example, analyzer 130 may display a color-coded indicator consistent with the determined valve state.

Figure 8:
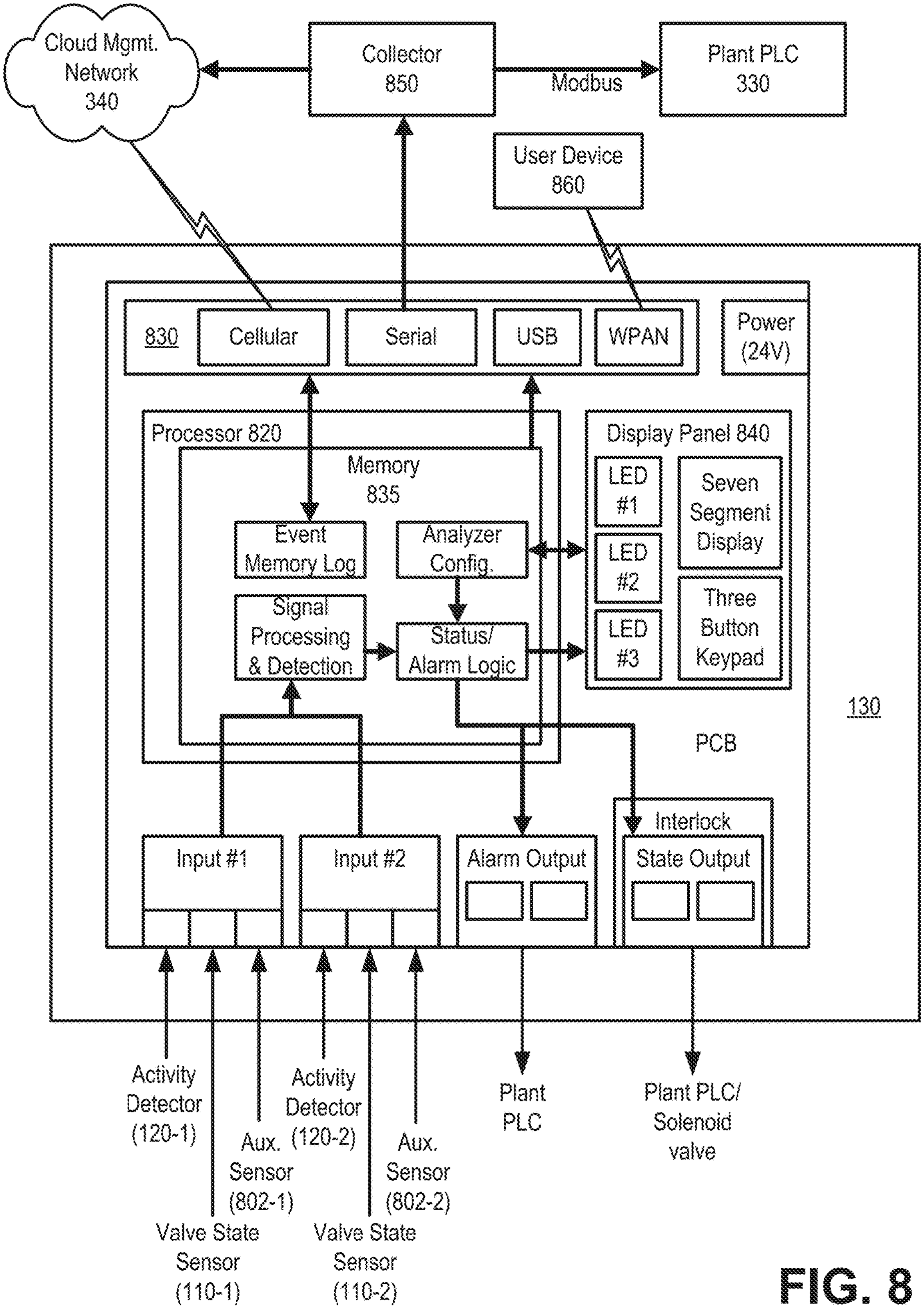
FIG. 8 is a block diagram of components of the analyzer device and example communications, according to an implementation.

FIG. 8 is a block diagram of components of analyzer 130 and example communications, according to an implementation. Components of analyzer 130 may be included, for example, within a housing or other physical structure. Components of analyzer 130 may be powered by an external power source (not shown) such as the same power source used for solenoid valve 104 and/or a separate battery to power analyzer 130. As shown in FIG. 8, analyzer 130 may include a processor 820, a communications module 830, memory 835, and a display panel 840. According to an implementation, one or more components of components analyzer 130 may be installed on a printed circuit board (PCB), an etched wiring board, or a printed circuit assembly.

Processor 820 may include one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 820 may be implemented as hardware (e.g., a microprocessor, etc.), a combination of hardware and software (e.g., a SoC, an ASIC, etc.) and may include one or multiple memories (e.g., memory 835). For example, processor 820 may include stored instructions to implement one or more of the logical components of FIG. 5.

Processor 820 may control the overall operation or a portion of operation(s) performed by analyzer 130. Processor 820 may collect and process readings from one or more valve state sensors 110, activity detectors 120, and/or auxiliary sensors 802 (e.g., input #1, input #2, etc.) as described herein. According to an implementation, processor 820 may include a clock (e.g., a real-time counter) to generate a time stamp for valve status data provided to plant PLC 330 or cloud management network 340. Processor 820 may also be programmed to generate and send an alarm signal when an alarm state is detected. In some implementations, processor 820 may implement an interlock to prevent, for example, simultaneous liquid refrigerant and hot gas flows.

Communications module 830 may permit analyzer 130 to communicate with other devices, such as PLC 330, a collector 850, a user device 860, or a network device in cloud management network 340. In one implementation, for example, the communications module 830 may communicate with a network and/or devices connected to a network. Alternatively or additionally, communications module 830 may be a logical component that includes input and output ports, input and output systems, and/or other input and output components that facilitate the transmission of data to other devices. For example, the communication interface may include a network interface card (e.g., Ethernet card) for wired communications and/or a wireless network interface (e.g., a Wi-Fi) card for wireless communications. The communication interface may also include a universal serial bus (USB) port for communications over a cable, a WPAN (e.g., Bluetooth™) wireless interface, a radio-frequency identification (RFID) interface, a near-field communications (NFC) wireless interface, a Modbus interface, and/or any other type of interface that converts data from one form to another form. Communications module 830 may also include various antennas, processing logic, or circuitry (e.g., multiplexing/de-multiplexing, filtering, amplifying, converting, error correction, etc.).

Display panel 840 may present status indicators and receive user input. In one implantation display panel 840 may include multicolored LEDs to represent a valve status and/or alarm status. A display and button keypad may be used to solicit and accept user input, such as user input to configure analyzer 130.

Collector 850 may include an analyzer 130 or another device that is configured to receive and forward signals from other analyzers in a refrigeration system. In an implementation, collector 850 may be an analyzer that self-configures forwarding responsibilities among a group of analyzer peers. In another implementation, collector 850 may be a separate device (e.g., collector 335) configured to receive signals from multiple analyzers 130 and forward combined/consolidated signals to plant PLC 330. Collector 850 may, for example, receive signals from analyzer 130 over a serial interface (e.g., RS485) and forward the signals to plant PLC 330 via a Modbus interface.

User device 860 may include a device that has computational and wireless communication capabilities. User device 860 may be implemented as a mobile device, a portable device, a customized device, a stationary device, a device operated by a user, or a device not operated by a user. For example, user device 860 may be implemented as a smartphone, a computer, a tablet, a wearable device, or some other type of wireless device. User device 860 may pair with analyzer 130 via a WPAN connection to obtain data or provide instructions. According to exemplary embodiments, user device 860 may be configured to execute various types of software (e.g., applications, programs, etc.) to support remote monitoring for a pipeline. According to an implementation, user device 860 may provide wireless access to signals (e.g., alarm signals) and/or data from analyzer 130. According to another implementation, user device 860 may provide configuration settings to analyzer 130. According to one implementation, user device 180 may download and/or register a client application to obtain access to analyzer 130.

Systems and methods described herein may be applied in a variety of use cases for different refrigeration systems. FIGS. 9-14 illustrate examples of different use cases where detectors (e.g., activity detectors 120) may be deployed for non-intrusive detection of a valve state in refrigeration systems and other systems employing feed lines and valves. Valve state sensors 110 and analyzers 130 would also be included in each use case, but are not illustrated for simplicity. The various activity detectors 120 and/or valve state sensors 110 described in FIGS. 9-14 may communicate with analyzers 130 in a manner described above.

FIG. 9 illustrates a use case for indication/validation of valve activity. Activity detectors 120 may be installed at Hot Gas (H), Liquid (L), Suction (S), Defrost Relief (D) lines, as indicated in FIG. 9. In another use case, the configuration of FIG. 9 may also be deployed in a use case for improving energy efficiency. Where analyzer(s) 130 are equipped for remote connectivity (e.g., via cellular or via collector 850), analyzer 130 may continually detect/identify leaking or malfunctioning valves and thereby reduce the associated energy loss (as well as reducing the amount of routine maintenance inspections by skilled technicians).

FIG. 10 illustrates another energy efficiency use case. Activity detectors 120 may be installed at Hot Gas (H) and Liquid (L) valves, and a Temperature Terminate (T) and/or a Frost Condensate (F) sensor may be installed on the evaporator. Analyzer 130 may identify energy waste associated with leaking valves and minimizes excessive Hot Gas defrost time. Where analyzer(s) 130 are equipped for remote connectivity, analyzer 130 may report leakage incidents to PLC 330 or network 340.

Figure 11:
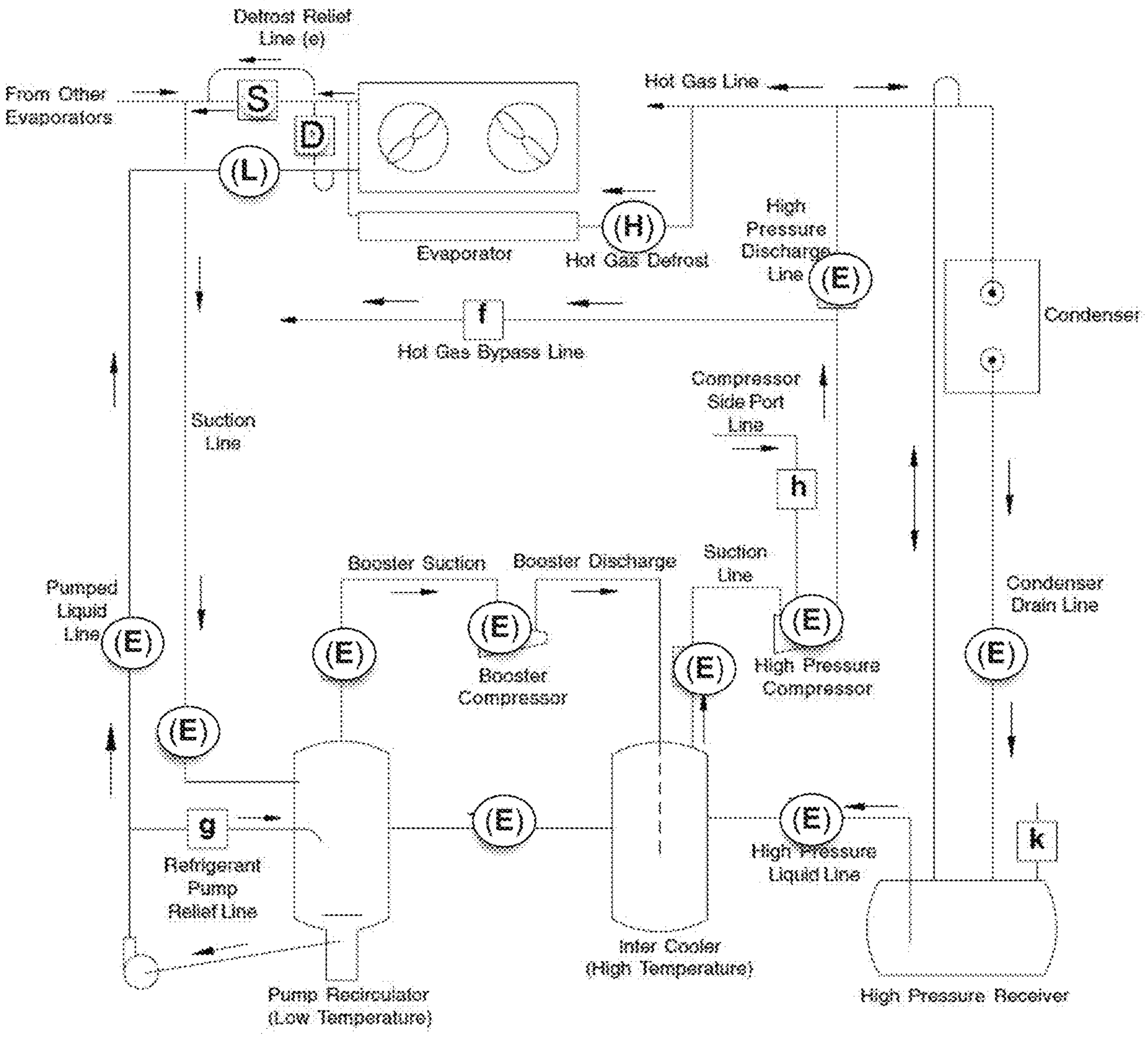

FIG. 11 illustrates a use case for compliance testing and/or monitoring. Activity detectors 120 may be installed at Hot Gas (H), Liquid (L), Emergency (E) valves, as indicated in FIG. 11. The configuration in FIG. 11 may facilitate compliance by validating and documenting testing of emergency (solenoid and shut-off) valve function in accordance with regulatory requirements. In another use case, where analyzer(s) 130 are equipped for remote connectivity (e.g., via cellular or via collector 850), the system can also continuously monitor the proper function of valves that would be relied upon during an emergency.

Figure 12:
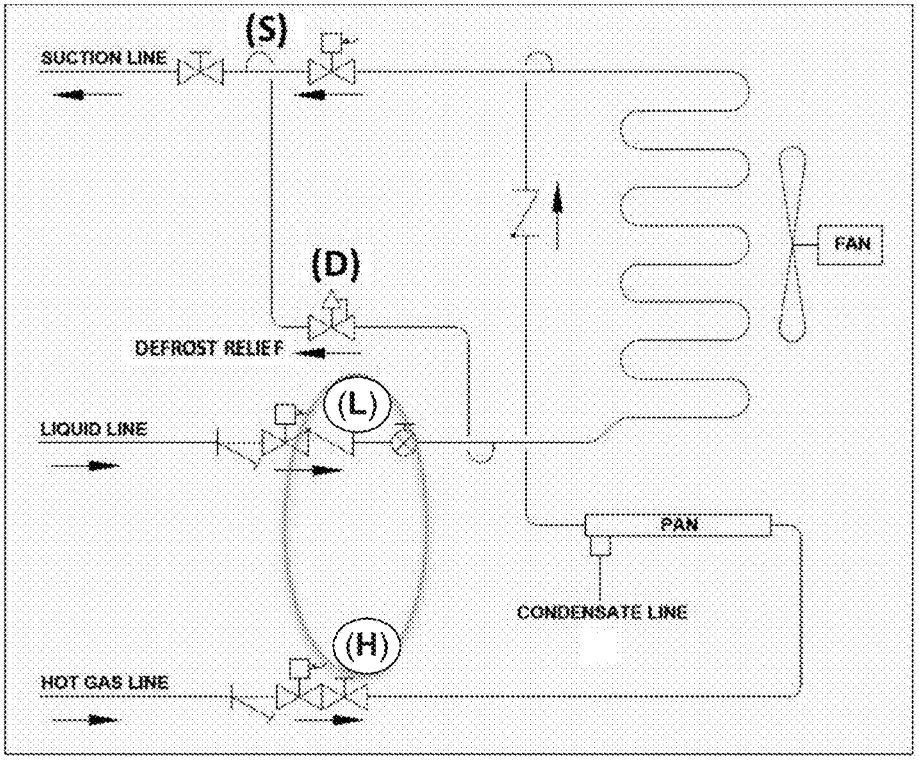

FIG. 12 illustrates a use case for safety where Hot Gas (H) and Liquid (L) valves have valve state detectors 110 that include an interlock (e.g., either local and/or remote). In the configuration of FIG. 12, analyzer 130 serves as a safety device that ensures Hot Gas and Liquid flow will not occur at same time (interlock).

Figure 13:
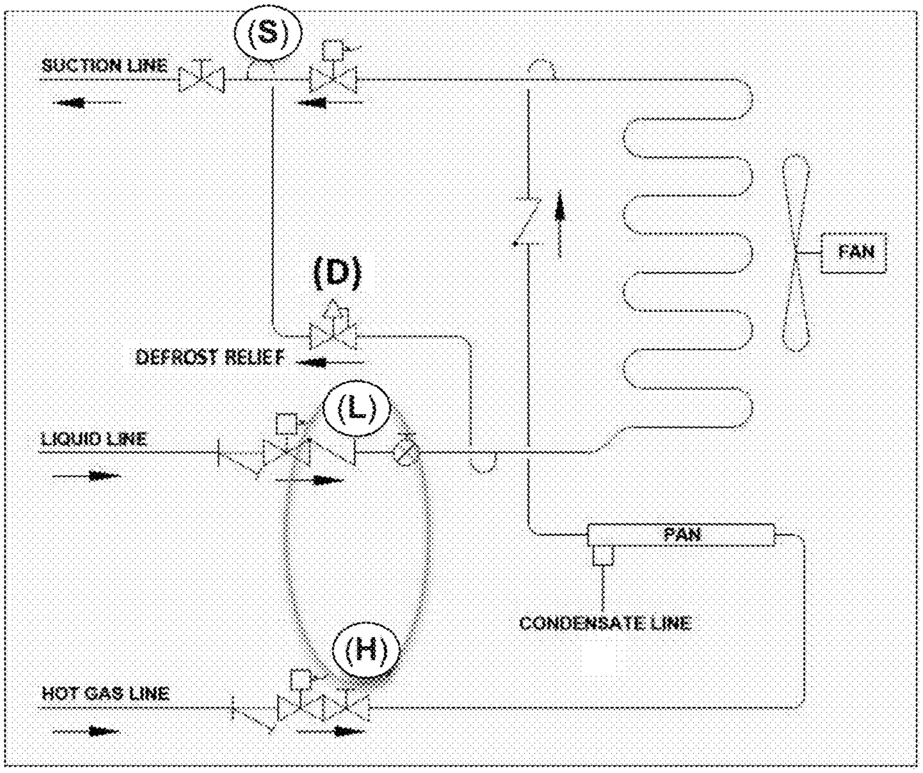

FIG. 13 illustrates a use case for safety where Hot Gas (H) and Liquid (L) valves have valve state detectors 110 that include an interlock and suction (S) valves have auxiliary valves with hydraulic shock event detection (e.g., local and/or remote). In the configuration of FIG. 13, analyzer 130 may be connected to an auxiliary shock sensor 802 (e.g., an accelerometer) located near a suction (S) valve. In the configuration of FIG. 13, analyzer 130 serves as a safety device that ensures Hot Gas and Liquid flow will not occur at same time (interlock) and provides alerts when "hydraulic shock" events, detected by the accelerometer, occur near suction valves, such as when a suction valve opens too soon.

Figure 14:
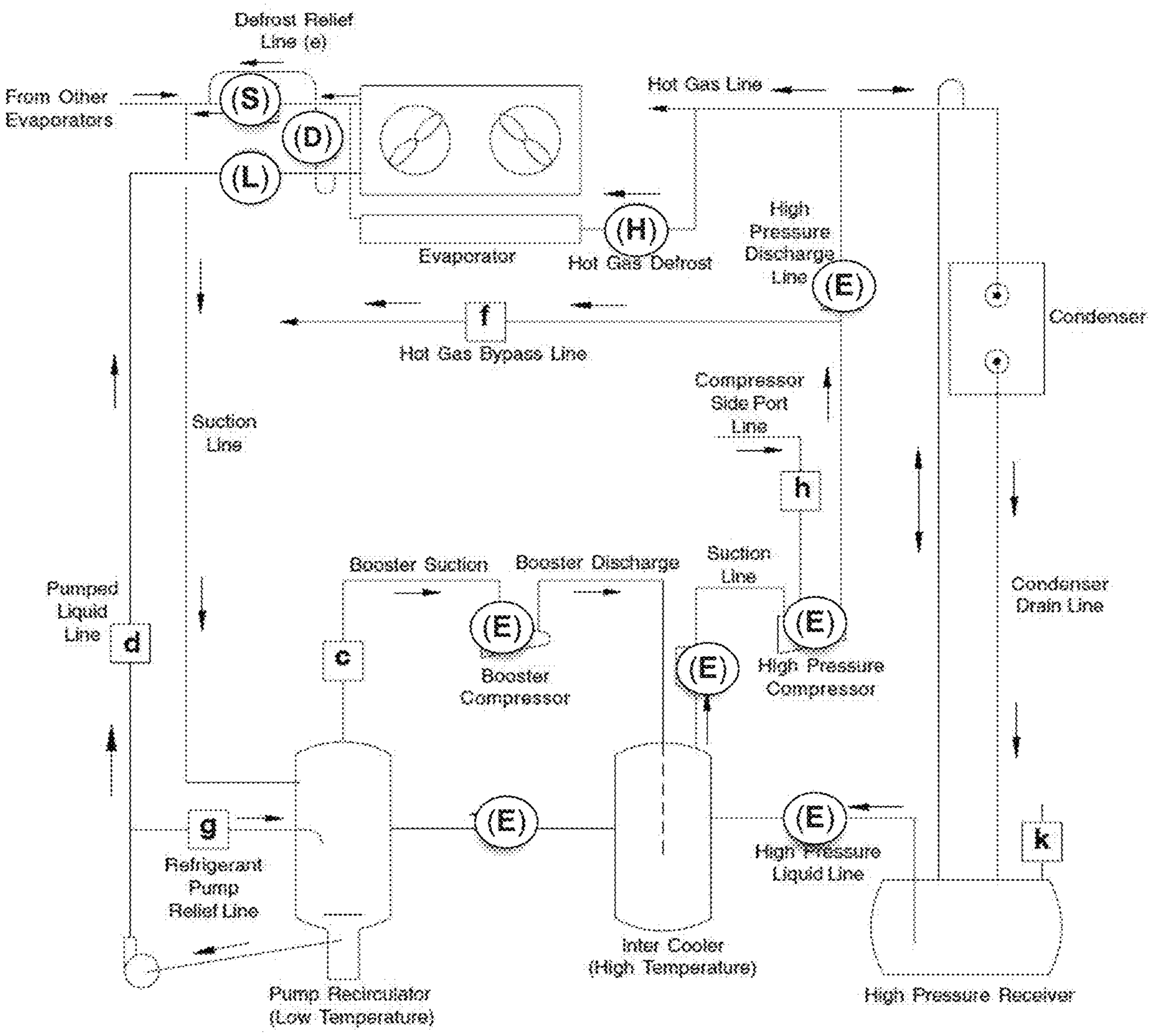

FIG. 14 illustrates a use case for maximizing uptime, where activity detectors 120 may be installed at all control valves (e.g., Emergency (E), Suction (S), Defrost Relief (D), Hot Gas (H), and Liquid (L)) in a piping system. Analyzer 130 may provide continuous monitoring, which helps to eliminate unexpected downtime and product quality issues by identifying problems with valves early.

The foregoing description of exemplary implementations provides illustration and description, but is not intended to be exhaustive or to limit the embodiments to the precise form disclosed. Modifications and variations are possible in light of the above teachings or may be acquired from practice of the embodiments.

For example, features have been described above with respect to a valve state detection system for a refrigeration system. In other implementations, the valve state detection system described herein may be used with other types of systems. For example, the processing described herein may be used with pressure valves for steam or other fluids.

Further, while series of blocks or acts have been described with respect to FIGS. 6 and 7, the order of the blocks or acts may be different in other implementations. Moreover, non-dependent blocks may be implemented in parallel.

It will be apparent that various features described above may be implemented in many different forms of software, firmware, and hardware in the implementations illustrated in the figures. The actual software code or specialized control hardware used to implement the various features is not limiting. Thus, the operation and behavior of the features were described without reference to the specific software code—it being understood that one of ordinary skill in the art would be able to design software and control hardware to implement the various features based on the description herein.

Further, certain portions of the invention may be implemented as "logic" that performs one or more functions. This logic may include hardware, such as one or more processors, microprocessors, application specific integrated circuits, field programmable gate arrays or other processing logic, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

All structural and functional equivalents to the elements of the various aspects set forth in this disclosure that are known or later come to be known to those of ordinary skill in the art are expressly incorporated herein by reference and are intended to be encompassed by the claims.

What is claimed is:

1. A system comprising:
- an activity detector configured to monitor flow downstream or upstream of a valve in a pipeline of a piping system; and
- an analyzer assembly including a processor and a memory configured to:
  - store one or more state detection logics corresponding to one or more use cases of the piping system,
  - receive input to select a use case,
  - select one of the state detection logics corresponding to the selected use case,
  - identify a flow reading based on a signal from the activity detector,
  - determine a status of the piping system, based on the flow reading and the selected state detection logic corresponding to the selected use case,
  - store a life-cycle indicator for the valve, and
  - monitor received valve state data against the life-cycle indicator.

2. The system of claim 1, wherein the one or more state detection logics correspond to use cases for an operational mode and a compliance test mode of the piping system.

3. The system of claim 1, wherein the activity detector is configured to be secured to an outside surface of the pipeline or the valve.

4. The system of claim 1, wherein the activity detector is configured to non-intrusively collect flow data from the pipeline so as to generate the signal for the analyzer assembly to identify the flow reading.

5. The system of claim 1, wherein the processor is further configured to process signals from the activity detector as signals for a group including one of gas flow, liquid flow, and mixed gas and liquid flow.

6. The system of claim 1, wherein, when identifying the flow reading, the processor is further configured to:

obtain a monitoring threshold, of multiple monitoring thresholds, corresponding to a medium in the pipeline, receive, from the activity detector, a monitoring signal, and compare the monitoring signal to the monitoring threshold to determine if there is flow of the medium.

7. The system of claim 6, wherein, when identifying the flow reading, the processor is further configured to perform signal conditioning prior to the comparing.

8. The system of claim 1, further comprising:

a valve state sensor corresponding to the valve in the pipeline, wherein the processor is further configured to:

identify a valve state based on a signal from the valve state sensor, and determine the status of the piping system, based on the valve state, the flow reading, and the state detection logic corresponding to the selected use case.

9. The system of claim 1, wherein the processor is further configured to:

identify one or more thresholds corresponding to the selected use case.

10. The system of claim 1, wherein the analyzer assembly further includes a communication interface to send, to an external device, a signal indicating the determined status.

11. The system of claim 10, wherein the communication interface includes one of:

a wired interface, a wireless local area network (LAN) interface, or a wireless personal area network (PAN) interface.

12. The system of claim 1, wherein the processor is further configured to:

send, to a collection device, a signal indicating the determined status.

13. The system of claim 1, wherein the processor is further configured to:

generate an alarm signal based on the determined status.

14. The system of claim 1, further comprising:

an auxiliary sensor to detect one or more of temperature, moisture, vibration, or acceleration in the pipeline, wherein, when determining the status of the piping system, the processor is further configured to:

determine the status of the piping system based on a signal from the auxiliary sensor.

15. A method comprising:

storing, in a memory of an analyzer device, one or more state detection logics corresponding to one or more use cases of a piping system including a pipeline, receiving, by the analyzer device, user input to select a use case of the piping system, selecting one of the state detection logics corresponding to the selected use case, receiving, by the analyzer device, a valve state signal from a valve state sensor corresponding to a valve in the pipeline and a flow signal from an activity detector, wherein the activity detector is located upstream or downstream of the valve, identifying, by the analyzer device, a valve state based on the valve state signal from the valve state sensor, and a flow reading based on the flow signal from the activity detector, determining, by the analyzer device, a status of the piping system, based on the valve state, the flow reading, and the state detection logic for the selected use case, sending, by the analyzer device, interlock instructions to a valve in another pipeline of the piping system based on the determined status, and generating, by the analyzer device, an alarm signal based on the determined status.

16. The method of claim 15, wherein the activity detector is secured to an outside surface of the pipeline.

17. The method of claim 15, wherein the flow signal includes a vibration level, and wherein identifying the flow reading comprises applying a monitoring threshold for one of a gas flow, a liquid flow, or a mixed gas and liquid flow.

18. The method of claim 15, further comprising:

sending, by the analyzer device and to a collection device, a signal indicating the determined status.

* * * * *